United States Patent [19]
Slavenburg

[11] Patent Number: 6,002,880
[45] Date of Patent: *Dec. 14, 1999

[54] VLIW PROCESSOR WITH LESS INSTRUCTION ISSUE SLOTS THAN FUNCTIONAL UNITS

[75] Inventor: Gerrit Ary Slavenburg, Los Alto, Calif.

[73] Assignee: Philips Electronics North America Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/810,003

[22] Filed: Mar. 3, 1997

Related U.S. Application Data

[63] Continuation of application No. 08/445,963, May 22, 1995, abandoned, which is a continuation of application No. 07/998,080, Dec. 29, 1992, abandoned.

[51] Int. Cl.$^6$ ....................................................... G06F 9/38
[52] U.S. Cl. .................... 395/800.24; 395/391; 395/382; 395/376
[58] Field of Search ................................... 395/800, 391, 395/382, 392, 376, 800.24, 800.23

[56] References Cited

U.S. PATENT DOCUMENTS 4,942,525  7/1990  Shintani et al. ......................... 395/375
5,055,997  10/1991  Sluijter et al. ........................... 364/200

OTHER PUBLICATIONS

"Ohmega: A VLSI Superscalar Processor Architecture for Numerical Applications", by Nakajima et al, 18th Inter. Symposium on Computer Architecture, May 27, 1991, pp. 160–168.

De Gloria et al., "A Programmable Instruction Format Extension to VLIW Architectures", IEEE Computer Society, CompEuro 1992 Proceedings, May 4–8, 1992, pp. 35–40.

Matterne et al. A Flexible High Performance 2–D Discrete Cosine Transform IC.

Fisher; Replacing Hardware That Thinks (especially about parallelism/with a smart rompilier) Apr. 1988.

Case; "Phillips gives LIFE to VLIW" *Microprossor Report*; Aug. 1990.

*Primary Examiner*—Larry D. Donaghue
*Attorney, Agent, or Firm*—Anne E. Barschall

[57] ABSTRACT

A VLIW processor has less instruction issue slots than functional units. Operands and results for the operations specified by the instruction issue register are stored in a multiport register file. The multiport register file has numbers of read and write ports which are tied to the number of instruction issue slots rather than to the number of functional units. A write control unit controls transfer of results from functional units to the multiport register file to take into account instruction latency.

12 Claims, 11 Drawing Sheets

VLIW PROCESSOR WITH LESS INSTRUCTION ISSUE SLOTS THAN FUNCTIONAL UNITS

I RELATED APPLICATIONS

This is a continuation of application Ser. No. 08/445,963, filed on May 22, 1995, abandoned, which is a continuation of Ser. No. 07/998,080, filed on Dec. 29, 1992, now abandoned.

The following applications are incorporated by reference;

U.S. application Ser. No. 578,976 (PHA 1205) filed Sept. 5, 1990, which was abandoned and refiled as U.S. application Ser. No. 142,648 on Oct. 25, 1993;

U.S. application Ser. No. 594,534 (PHA 1209) filed on Oct. 5, 1990, which was abandoned and refiled as U.S. application Ser. No. 063,850 on May 15, 1993; and U.S. application Ser. No. 654,847 (PHA 1211) filed Feb. 11, 1992, which has since issued as U.S. Pat. No. 5,313,551;

all of which were continuations-in-part of U.S. application Ser. No. 290,979 (PHN 12,376) filed Dec. 28, 1988, which was abandoned and refiled as U.S. application Ser. No. 593,336 on Oct. 1, 1990, which has since issued as U.S. Pat. No. 5,103,311.

II BACKGROUND OF THE INVENTION

1. Field of the Invention

The invention relates to the architecture of very long instruction word (VLIW) processors.

2. Related Art

VLIW CPU's can be used in a variety of applications: from super computers to work stations and personal computers or even as dedicated or programmable processors in work stations, personal computers and video or audio consumer products.

FIG. 1 shows a prior art VLIW arrangement. Instructions are loaded from the Instruction Memory 102 to the Instruction Issue Register IIR. In each clock cycle, a new very long instruction, is transmitted from the instruction issue register IIR. This instruction contains an issue slot for each of the functional units (CONTROL, CONST, ALU1, ALU2, MUL, FPU, MEM) in the VLIW CPU. The VLIW machine may contain any useful combination of function units, the example shown here being only one such combination. There may be more or less functional units and there may be functional units of different types, depending on the desired operations. Operands for the functional units are read from a shared, multi-ported register file 101. Results from the functional units are also written to this file.

The issue slot specifies an operation that is started in the current clock cycle on that functional unit. FIG. 2 shows a VLIW instruction 201 containing a CONTROL operation, a CONST operation, an ALU1 operation, an ALU2 operation, a MUL operation, an FPU operation, and a MEM operation. In other words the VLIW instruction contains one issue slot for each functional unit in the VLIW CPU of FIG. 1.

202 shows the contents of the issue slot specifying the CONTROL operation. This issue slot contains a CONTROL opcode and two register specifications, Rsrc1 and Rsrc2, which are source register 1 and source register 2, respectively.

203 shows the contents of the issue slot specifying the CONST operation. This issue slot contains a constant value and an register specification, Rdest, which is the destination register.

204 shows the contents of the issue slots containing the ALU operations. This issue slot contains an ALU opcode and three register specifications, Rsrc1, Rsrc2, and Rdest.

205 shows the contents of the issue slot containing the MUL operation. This issue slot contains a MUL opcode and three register specifications, Rsrc1, Rsrc2, and Rdest.

206 shows the contents of the issue slot containing the FPU operation. This issue slot contains an FPU opcode and three register specifications, Rsrc1, Rsrc2, and Rdest.

207 shows the contents of issue slot containing the MEM operation. This issue register includes a MEM opcode and two register specifications, Rsrc1 and Rsrc2 or Rdest.

Again the contents of these issue slots are exemplary and may be adjusted to any useful configuration of functional units.

In most prior art machines, an operation can be started on all functional units in each cycle. An operation started in cycle 'i' may complete in one cycle or take several cycles to complete. Completion is evidenced by the writing of the result of the operation in the destination register. For operations without result (such as 'store' operations), completion is the time at which the state change associated with the operation occurs.

Most of the function units of FIG. 1 are simple, such as the CONST (constant generation unit). This unit produces a constant that is put into the destination register. The ALU, MUL and FPU units perform arithmetic, logical and shift operations on one or two arguments and produce a single result in the destination register.

The CONTROL and MEM units are somewhat different.

The CONTROL unit determines the sequence in which instructions are issued. If a NOP (No Operation) is issued on the CONTROL unit, instructions will be issued in sequential order from the Instruction Memory. If a CJMPF or CJMPT (Conditional JuMP False and Conditional JuMP True, respectively) operation is issued on the control unit, the Rsrc1 register contents will be interpreted as having a truth, i.e. boolean, value and the Rsrc2 register content will be used as the address from which instruction issue will continue if and only if the specified condition is met, otherwise instruction issue will proceed sequentially.

The MEM unit performs load and store operations. In other words, it moves data words between the register file and system main memory. A load operation uses Rsrc1 as the address in main memory of the data word to be loaded, and Rdest identifies the register in which the loaded value is to be stored. A store operation uses the contents of Rsrc1 as the address and the contents of Rsrc2 as the value to be stored. There are, of course, many variants of the load and store operations. Since load instructions do not require Rsrc2 and store instructions do not require Rdest, the issue slot need only contain 2 register fields.

In order for a software program to run on a VLIW machine, a "fine grain parallel" or "instruction level parallel" translation must be found. This is done by a compiler that translates a conventional high-level programming language, such as ANSI-C, into instructions for a VLIW machine. Compilers for use in VLIW machines are described in John R. Ellis, *BULLDOG: A compiler for VLIW architectures*, MIT Press 1985, ISBN 0-262-05034-X In order to operate the VLIW of FIG. 1 at its peak processing rate, 1 CONTROL, 1 CONSTANT, 2 INTEGER ALU, 1 INTEGER MULTIPLY, 1 FLOATING POINT, and 1 MEMORY operation must be issued in every cycle. Due to the nature of actual programs expressed in high level languages, it is not possible to find the appropriate mix of operations that will sustain this peak performance. After compiling, the set of operations that could be done in parallel in a given clock cycle are of a type mix that does not match the functional unit types that are available. In some cases, programs go through phases where less parallel operations can be found than the number of units in the machine.

This results in several problems.

First, register file ports are under utilized. The silicon area and power consumption of the central register file are proportional to the total number of ports. Hence it is important that the utilization of such ports be high.

Second, the instruction bandwidth needed to sustain the VLIW CPU at or near its peak performance is high. Empty slots, containing NOP codes, contribute to this bandwidth. The bandwidth translates directly into I-Cache (Instruction Cache) size and cost of the buses and other memory system components.

Third, the size of the code for a program translated for a VLIW is larger than the size of the same program when translated for a RISC style CPU. Even though the performance of a VLIW is higher than that of a RISC, the cost performance ratio of a VLIW is less than that of a RISC.

III SUMMARY OF THE INVENTION

It is an object of the invention to improve the cost-efficiency of VLIW machines.

This object is achieved by using an instruction issue register having less slots than the number of functional units.

IV BRIEF DESCRIPTION OF THE DRAWING

DETAILED DESCRIPTION OF THE PREFERRED EMBODIMENTS

Figure 1:
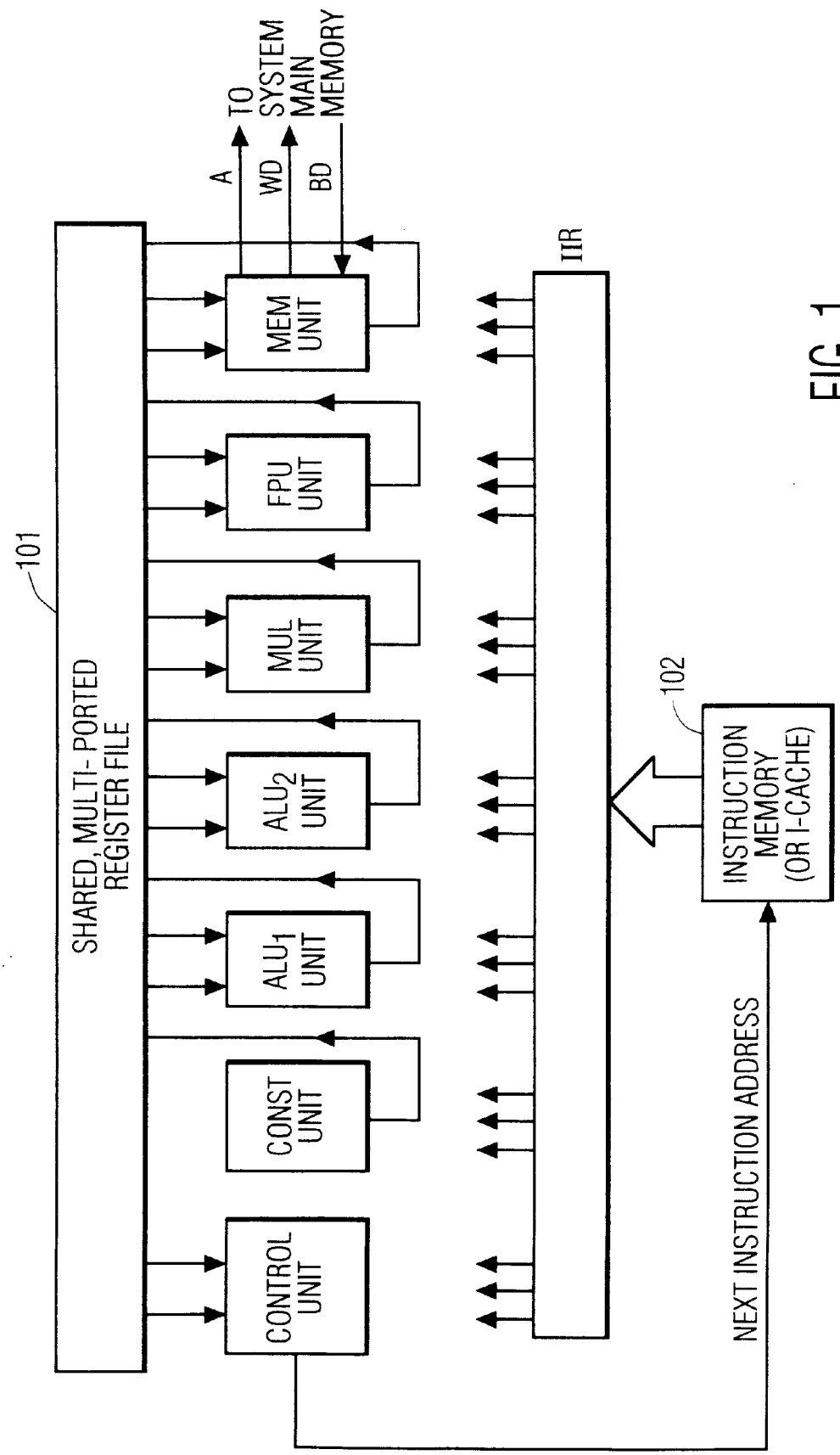
FIG. 1 shows a prior art VLIW CPU.
Figure 2:
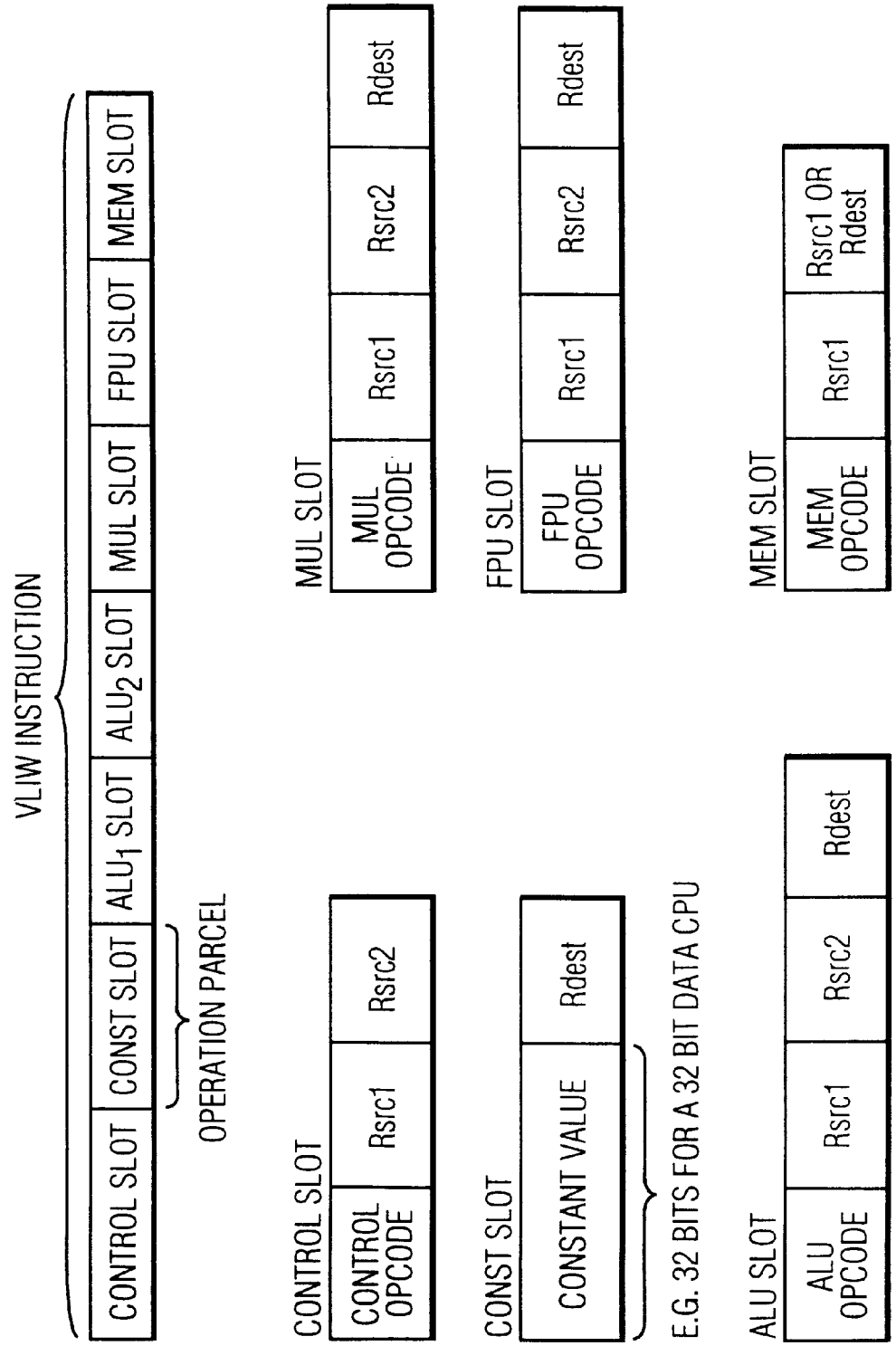
FIG. 2 shows the format of a prior art VLIW instruction word.
Figure 3:
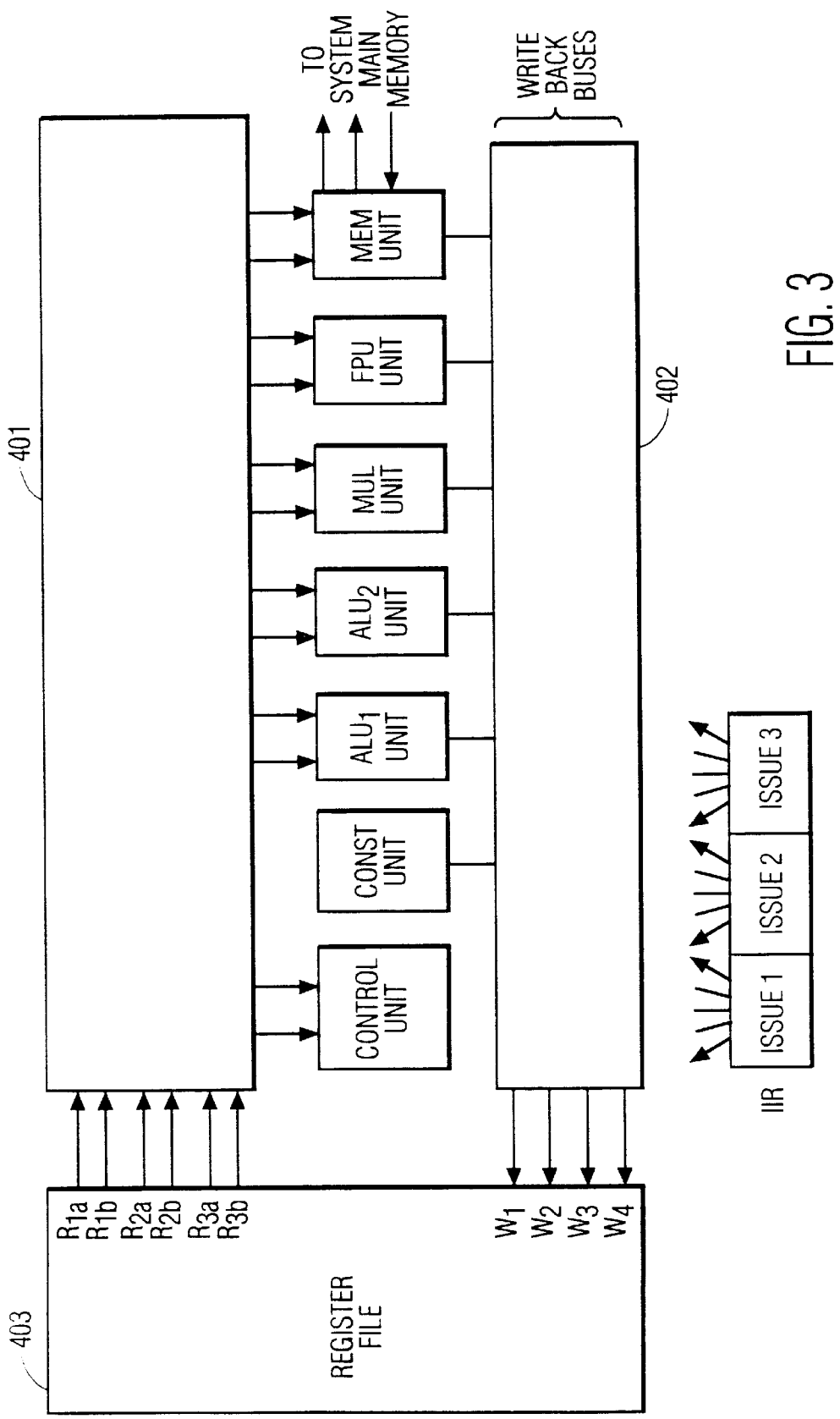
FIG. 3 shows a VLIW CPU according to the invention.

FIG. 3 shows a VLIW CPU according to the invention. The IIR now has less issue slots than there are functional units in the machine. As an example, for a machine with 7 functional units, 3 issue slots may suffice. In general, the number of issue slots for a given number and type of functional units is a tradeoff between average performance and cost, but it is reasonable to expect that a machine with N units will have between N/4 and 2N/3 issue slots.

The CPU includes a register file 403 having a plurality of groups of read ports $((R_{1a}, R_{1b}), (R_{2a}, R_{2b}), (R_{3a}, R_{3b}))$.

Examples of suitable register files can be found in the Intel iWARP & i960 chips. There is a group of read ports for each slot of the IIR. The read ports are for reading the contents of registers in the register file. The number of ports in each group is the same as the maximum number of source registers needed by any functional unit. In this case, no functional unit needs more than two source registers, so each group of read ports includes two read ports. Thus there are three groups of two read ports, giving six read ports.

A switching matrix 401, controlled by the input switch control 902 (FIG. 6b) determines which read port to connect to the inputs of which functional unit.

The register file also has a plurality of groups of write ports ($W_1$, $W_2$, $W_3$, $W_4$). There is at least one group of write ports for each slot of the IIR. The number of write ports in each group is the maximum number of destination registers needed by any functional unit. No functional unit in this example needs more than one destination register, therefore there is only one write port in each group of write ports.

A second switching matrix 402 connects outputs of the functional units to the write ports under control of the write control unit (RFWC).

Figure 4:
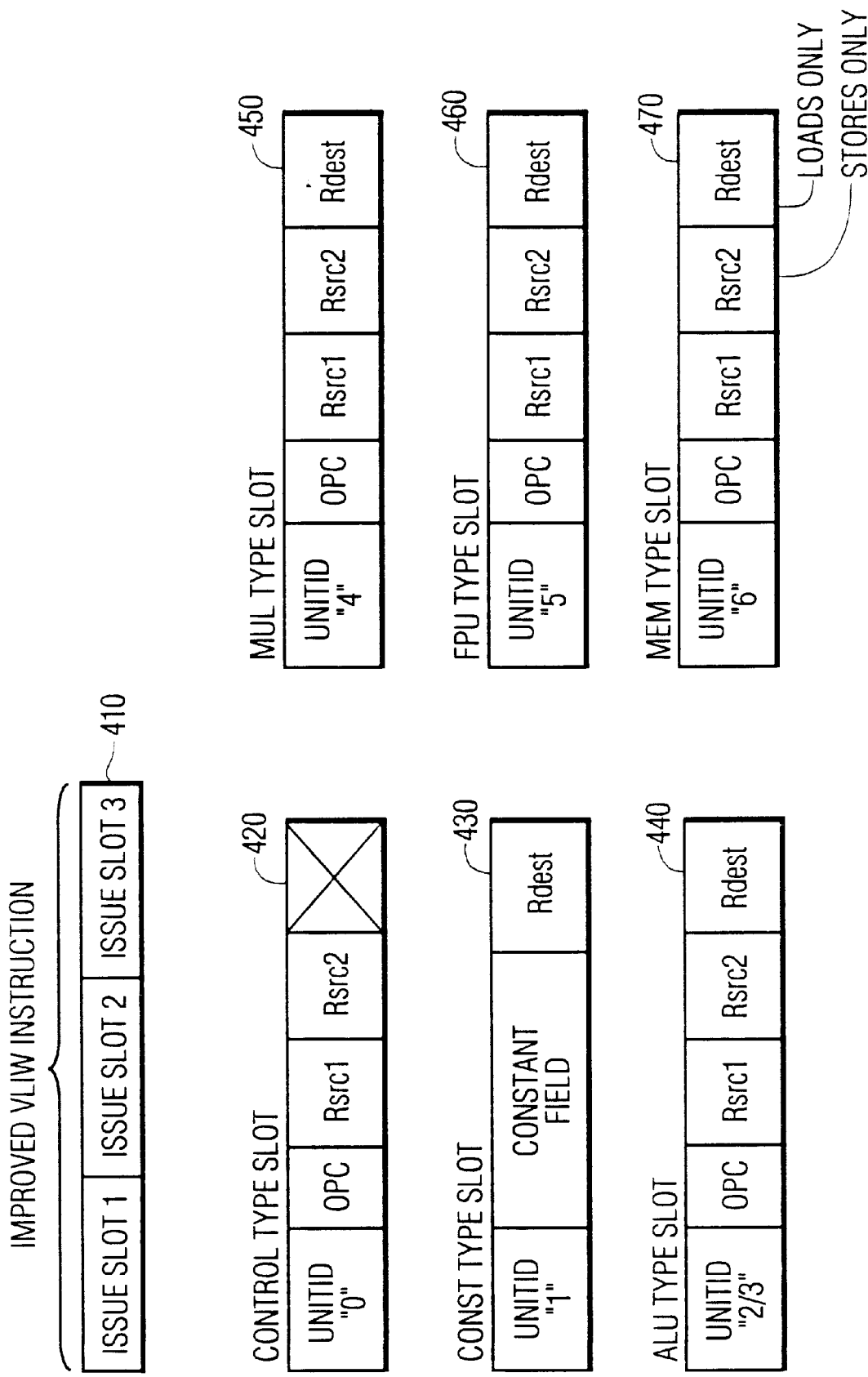
FIG. 4 shows the format of a VLIW instruction according to the invention.

FIG. 4 shows the format of the new VLIW instruction 410. This instruction has three slots for operation. Each of the slots may contain any type of operation. There are, as before, six types of operations, one for each of the types of functional units, CONTROL, CONST, ALU, MUL, FPU, and MEM.

The issue slots differ from the previous issue slots in several respects.

First, the issue slots are all of the same length. Format of the contents of the issue slots is shown at 420, 430, 440, 450, 460, and 470 for the CONTROL, CONST, ALU, MUL, FPU, and MEM units, respectively. The constant lengthe of the slots results in the necessity for insertion of some blank space at the end of the CONTROL type operation 420.

Second, the issue slots all have some way of identifying which functional unit is to execute the operation. In the figure, all of the issue slots have a UNIT ID field, which identifies which functional unit the operation is destined for. For a machine of up to 8 functional units, this UNIT ID field need only be three bits wide.

Those of ordinary skill in the art might devise many other ways of identifying the unit. One alternative is to have the opcode imply the unit. Another alternative is to have the opcode imply the unit type and the hardware allocate a unit of that type.

In the VLIW CPU of FIG. 3, in each clock cycle, a three operation instruction is issued from the IIR. The source register fields (Rsrc1,Rsrc2) in the issue slots are used to address the register file read ports $((R_{1a}, R_{1b}), (R_{2a}, R_{2b}), (R_{3a}, R_{3b}))$. Based on the unit identity field, the opcode controls are routed to the designated functional unit.

The destination register fields of all issue slots are routed to the write control unit (RFWC) which knows the latency of each functional unit and keeps track of when results are produced. This write control unit allocates appropriate buses to write results into the register file. For a three issue slot machine, there may be more than three write buses in order to handle traffic bursts that arise due to unequal unit latencies. Here there are four write buses for this eventuality.

The above example is only one embodiment. The designer needs to chose the number and type of functional units depending on the expected work load. The designer also needs to chose a number of issue slots in the IIR and a number of write buses to optimize cost/performance.

The architecture of the preferred embodiment gives easy upward compatibility. Suppose, for instance, it were desired to build a higher performance CPU, for instance including an additional FPU, ALU, and CONST and by increasing the number of slots in the IIR to four. The new machine can still use the binary unit ID's from the old machine, so long as the old unit identity field values map to the same unit types in the new machine. Code images for the old machine can then be run on the new machine by, e.g. during the program load phase, adding an additional NOP operation. The unit ID fields need only be stuffed with additional zeroes in case the new machine has a wider field than the old machine. However, no recompiling, re-scheduling, or re-assembly of codes is necessary and all compatibility issues can be solved at program load time.

Figure 5:
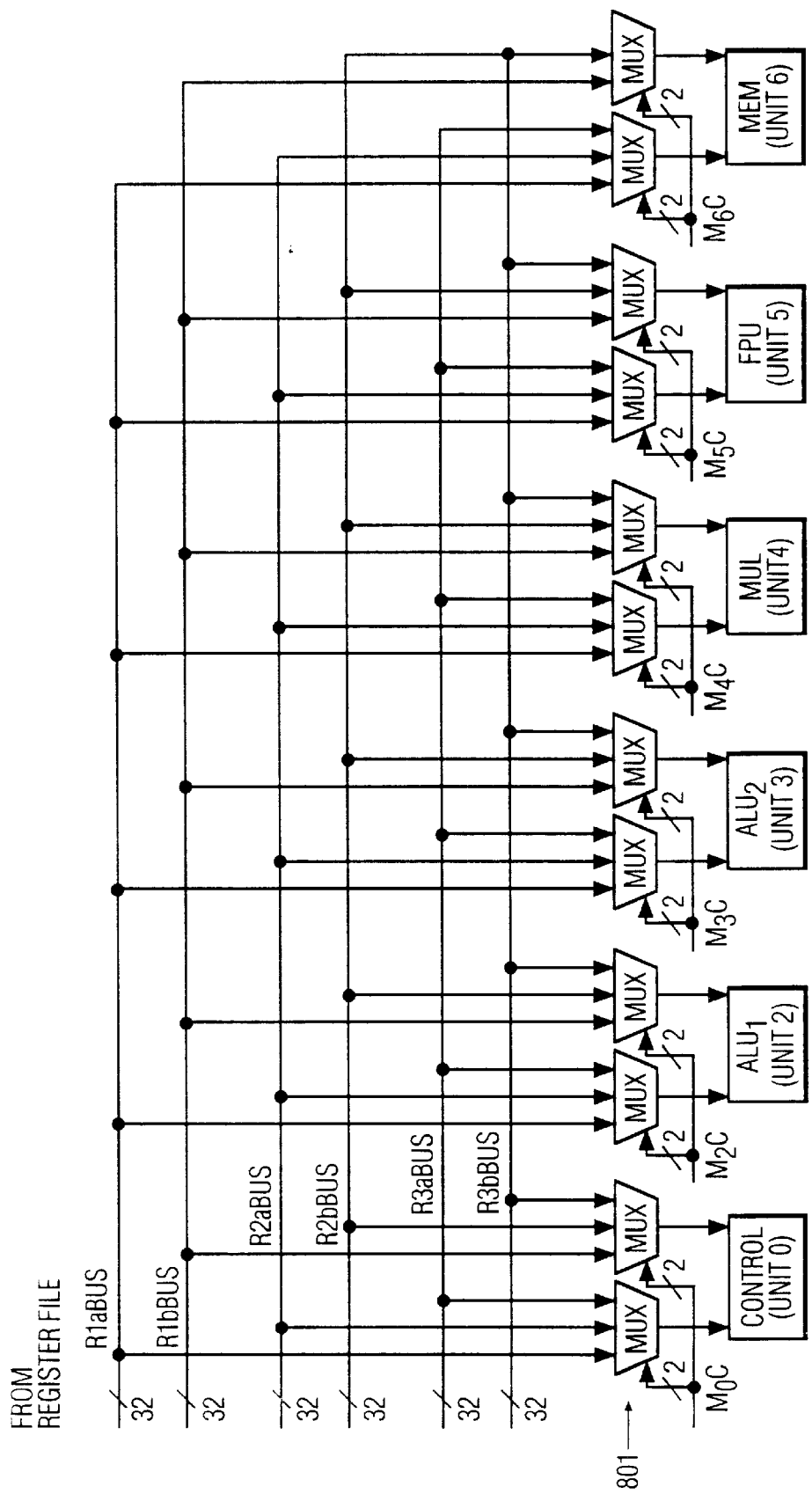
FIG. 5 shows more details of the switching matrix 401.

FIG. 5 shows an example of an implementation of the switching matrix between the register file read ports (($R_{1a}$, $R_{1b}$),($R_{2a}$,$R_{2b}$),($R_{3a}$,$R_{3b}$)) and functional unit inputs. One of ordinary skill in the art might devise any number of alternative embodiments for this switching matrix.

Each register file read port connects to inputs of all multiplexers 801 associated with the corresponding functional unit input ports, i.e. port $R_{1b}$ connects to all 'B' input multiplexers of all functional units.

When an instruction reaches the issue stage, the IIR contains the binary code for that instruction. As soon as the instruction issues, the Rsrc1 and Rsrc2 field of each issue slot are use as read addresses to the register file read ports (($R_{1a}$,$R_{1b}$),($R_{2a}$,$R_{2b}$),($R_{3a}$,$R_{3b}$)). This causes a total of 6 registers to be read. Not all of these registers may actually be needed. For instance, slot 1 may be issuing a constant type operation, in which case the register file addresses are random. However, if the operation that issued needed Rsrc1, Rsrc2, or both, the appropriate register values will become available to all MUX inputs of the functional units, in particular to the MUX of the functional unit that the operation is to be executed on.

Figure 6A:
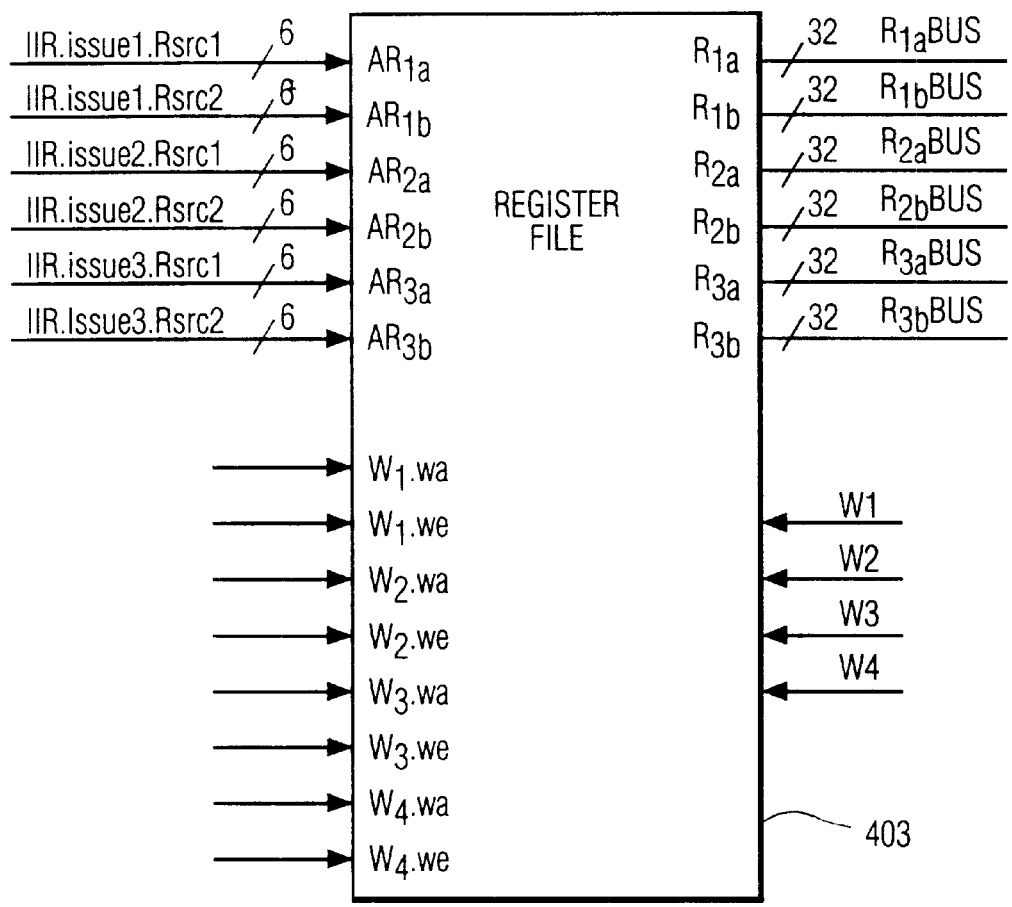
FIG. 6a shows inputs to and outputs from the register file.
Figure 6B:
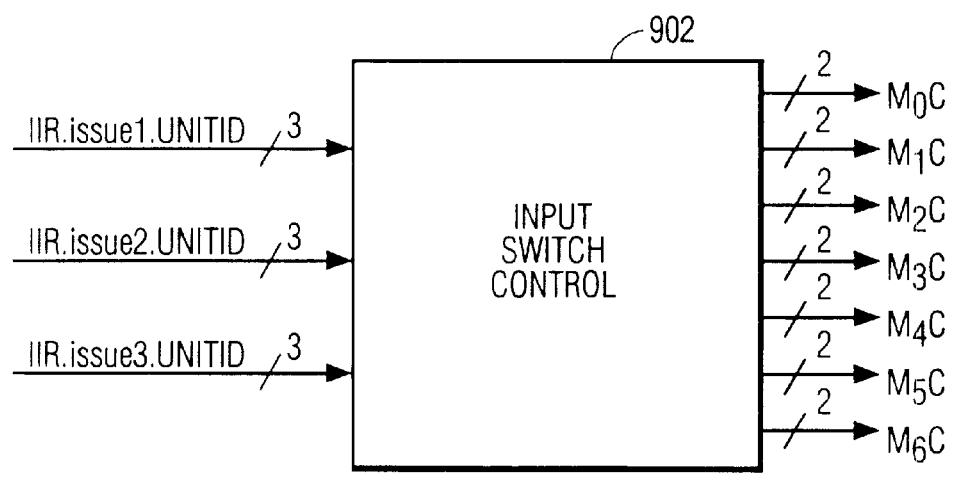
FIG. 6b shows inputs to and outputs from the input switch control.

FIG. 6a shows the register file 403 with its read ports and addressing ports. FIG. 6b shows the input switch control logic block 902.

As shown, read address inputs (($AR_{1a}$,$AR_{1b}$), ($AR_{2a}$, $AR_{2b}$), ($AR_{3a}$,$AR_{3b}$)) to the Register File 403, are all six bits wide and supplied from the register source fields of the Instruction Issue Register IIR, i.e. IIR.issue1.Rsrc1, IIR.issue1.Rsrc2, IIR.issue2.Rsrc1, IIR.issue2.Rsrc2, IIR.issue3.Rsrc1, and IIR.issue3.Rsrc2, respectively. Based on these addresses, operands are supplied as needed to the functional units from the read ports (($R_{1a}$,$R_{1b}$), ($R_{2a}$,$R_{2b}$), ($R_{3a}$,$R_{3b}$)).

Figure 8:
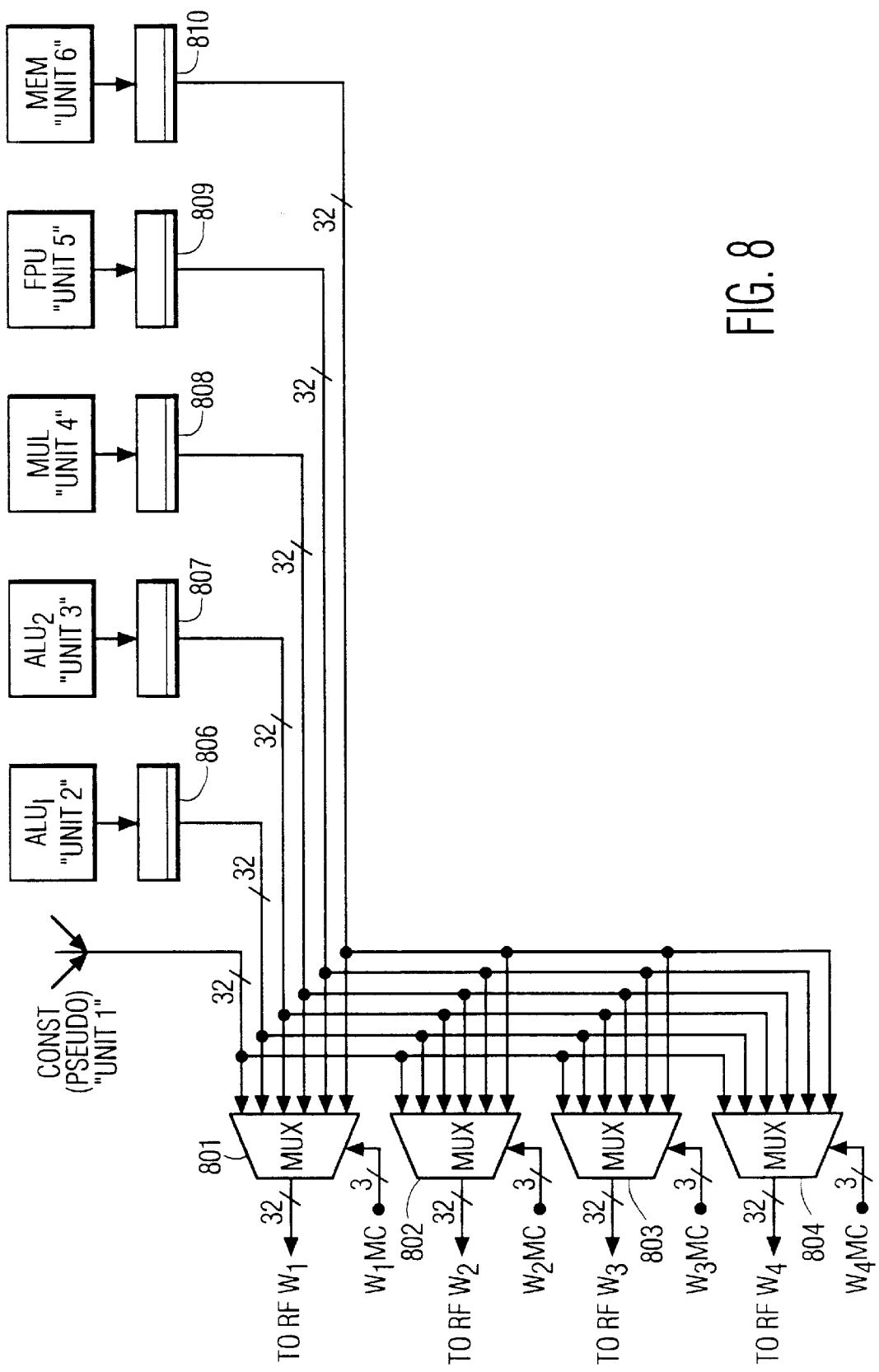
FIG. 8 shows detail of the output matrix 402.
Figure 9A:
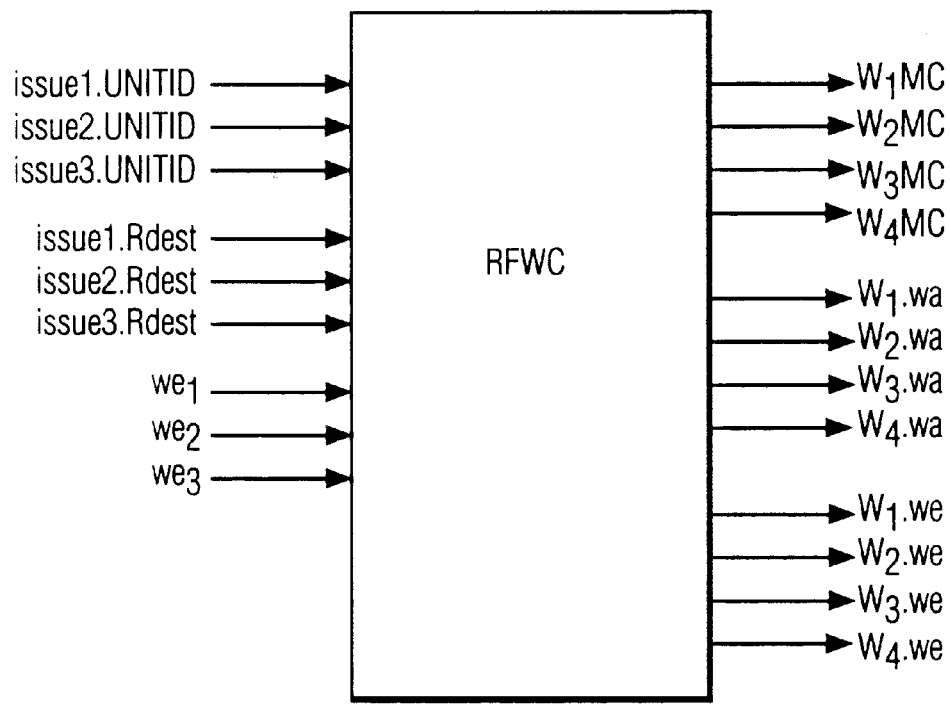
FIG. 9a shows the register file write control unit.

Write address inputs ($W_1$.wa, $W_2$.wa, $W_3$.wa, $W_4$.wa) and write enable inputs ($W_1$.we, $W_2$.we, $W_3$.we, $W_4$.we) are supplied from the RFWC of FIG. 9a. Results of operations are supplied on $W_1$, $W_2$, $W_3$, and $W_4$ from multiplexers 801, 802, 803, and 804 of FIG. 8.

Addressing inputs to the input switch control 902, i.e. IIR.issue1.UNITID, IIR.issue2.UNITID, IIR.issue3.UNITID, are supplied from the unit id fields of the instruction issue register. From these addressing inputs, input switch control 902, determines the two bit signals $M_0C$, $M_1C$, $M_2C$, $M_3C$, $M_4C$, $M_5C$, and $M_6C$. These multiplexer control signals are supplied to the multiplexers 801, to choose which read buses from the register file are supplying operands to the respective functional unit inputs.

Figure 7:
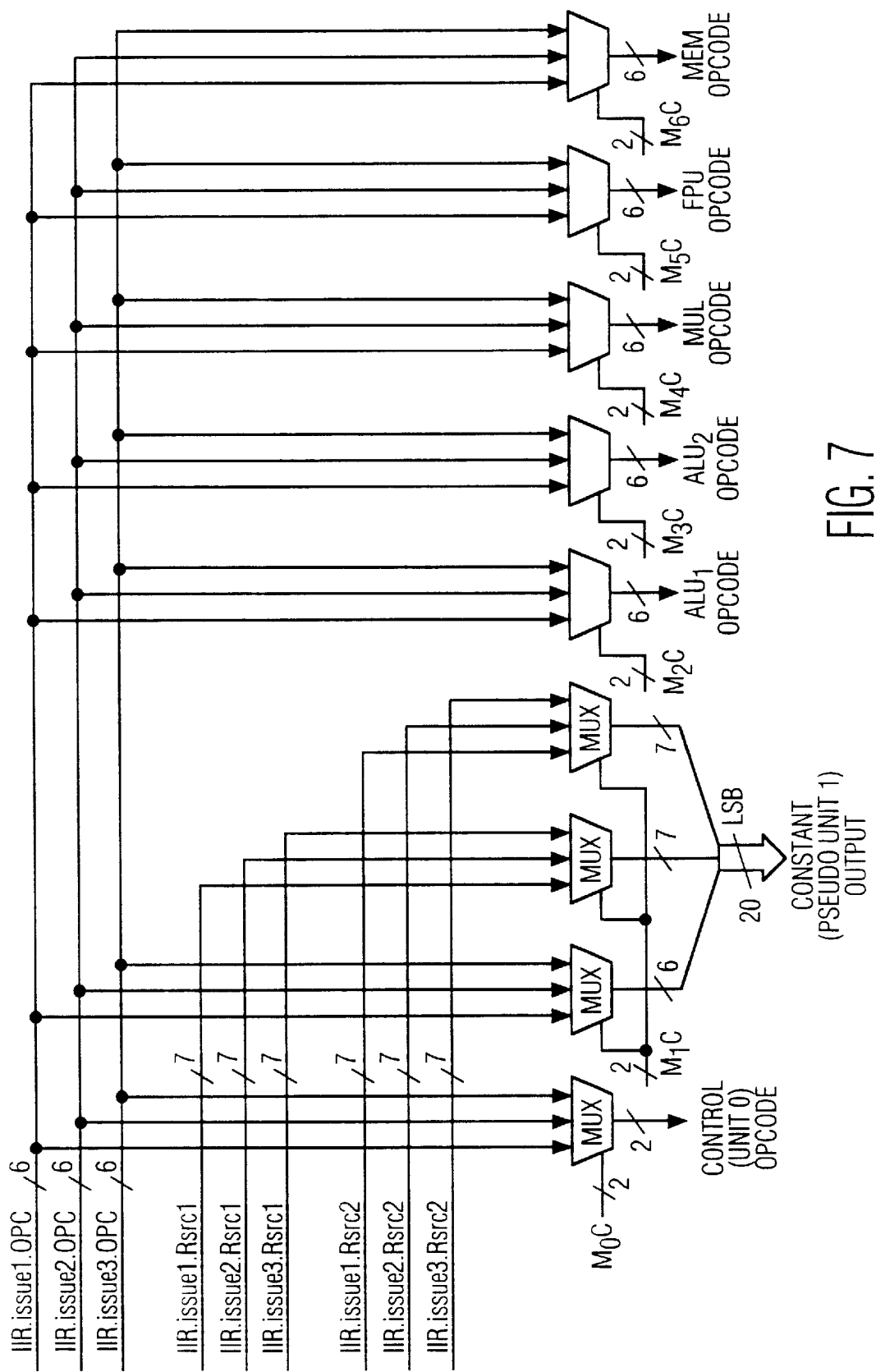
FIG. 7 shows opcode dispatch logic.

FIG. 7 shows an example of the opcode formation and dispatch logic that generates all opcodes for all functional units.

The input switch control 902 is a functional logic block which can be implemented in a number of known ways, such as standard cell logic, PLA, or ROM lookup table. For purposes of discussion, the following unit ID assignment will be assumed: unit 0=control; 1=CO, 2=ALU1, 3=ALU2, 4=MUL, 5=FPU, and 6=MEM. It will also be assumed that a multiplexer control field of 1 selects the left most input, 2 selects the middle input, and 3 selects the right most input. From these assumptions a conversion table can be constructed which converts from any combination of unit ID assignments to the necessary combination of multiplexer control fields. Some example input and output vectors from this table are given below:

| Issue 1 | Issue 2 | Issue 3 | Outputs | | | | Note |
|---------|---------|---------|---------|---|---|---|------|
| unit 1  | unit 4  | unit 6  | $M_1C = 1$ | $M_4C = 2$ | $M_6C = 3$ | others = 0 | (1) |
| unit 0  | unit 2  | unit 3  | $M_0C = 1$ | $M_2C = 2$ | $M_3C = 3$ | others = 0 | (2) |

Note (1) Issue slot 1 issues a CONST (constant) unit operation. Since the CONST unit has no inputs, it has no multiplexer controls; however, the opcode routing logic in FIG. 7 needs the $M_1C$ signal to control the CO unit opcode result multiplexer. Issue slot 2 issues a MUL operation, hence $M_4C=2$ causes the two multiplexers of the MUL (multiplier) unit to be set to select the $R_2$ port values. All other multiplexers are set to position 0, which on the opcode dispatch logic has a special use. If the unit 6 operation issued by issue slot 3 is a load, the opcode routed to the MEM unit will cause it to ignore the value of $R_{3b}$ BUS, since the Rsrc2 operand is not used by the load operation.

Note (2): All multiplexers for a unit to which an operation is issued select the register port corresponding to the issue slot issuing their operation. This is the general rule for constructing the logic equations of the input switch control block.

Parallel to the register read port value switching, the circuitry in FIG. 7 generates the individual functional unit opcodes. The same multiplexer control signals are used in this circuit as in FIG. 5 The rule is that if issue slot X contains an operation for unit Y, then unit Y receives multiplexer control signal value X, and hence Y's multiplexer selects the opcode field in issue slot X as the opcode for its operation.

Any unit to which nothing was issued receives a multiplexer select signal of zero. This causes generation of a no operation (NOP) opcode for that unit. This can either be done by adding an extra input to the multiplexers receiving that no operation code (not shown) or by changing the logic equations of the opcode multiplexer units.

In FIG. 7, the CONST unit is special. It is really a dummy unit. It generates, as result output, the binary value that is the concatenation of the opcode, Rsrc1 and Rsrc2 fields of the issue slot in which a CO unit operation was issued.

Those of ordinary skill in the art might devise any number of alternative embodiments for FIGS. 5–7. For instance, high performance machines will probably be pipelined. In such cases pipeline registers and bypass circuitry will be added to this basic design. Also, the UNITID and opcode fields in an operation may be combined into a single field with movable separation between the fields. Such a movable separation would accommodate the different numbers of opcode bits required for different functional units. For example, an ALU needs many more opcode bits than a MUL or MEM unit. Thus the UNITID field should be shorter and the opcode field longer for the ALU than for the MUL and MEM units. In such cases, the input switch control block may receive the longest possible set of bits that indicates the unit ID, at the same time the opcode dispatch logic receives the longest possible set of bits that indicates an opcode.

Other possible variations may exist. A UNITID field need not be used. The hardware can use a table to map which opcode goes to which functional unit type and assign unit ID fields dynamically.

FIG. 8 shows more detail of the output matrix 402. The functional units write results of operations performed in output registers 806, 807, 808, 809, and 810. The registers 806, 807, 808, 809, and 810 are connected to write port multiplexers 801, 802, 803, and 804, which have 32 bit bus inputs. The CONST unit opcode directly connects to the multiplexers 801, 802, 803, and 804, since in the CONST unit no time elapses between opcode and result availability, as seen in FIG. 7. Multiplexers 801, 802, 803, and 804 choose which of their inputs to route to their outputs $W_1$, $W_2$, $W_3$, and $W_4$, respectively, based on control inputs $W_1MC$, $W_2MC$, $W_3MC$, and $W_4MC$, respectively. The outputs $W_1$, $W_2$, $W_3$, and $W_4$ are each 32 bits wide and connect to the write ports of register file 403. The control inputs $W_1MC$, $W_2MC$, $W_3MC$, and $W_4MC$ are supplied by the register file write control unit (RFWC).

FIG. 9a shows the register file write control unit (RFWC). The inputs of the RFWC are the unit id's (issue1.unitid, issue2.unitid, issue3.unitid) and destination register addresses (issue1.rdest, issue2.rdest, issue3.rdest) from the IIR.

The RFWC produces, as outputs, the four multiplexer control signals ($W_1MC$, $W_2MC$, $W_3MC$, and $W_4MC$), four write addresses ($W_1$.wa, $W_2$.wa, $W_3$.wa, $W_4$.wa) for addressing the register file, and four write port write enable signals ($W_1$.we, $W_2$.we, $W_3$.we, $W_4$.we) also directed to the register file.

Figure 9B:
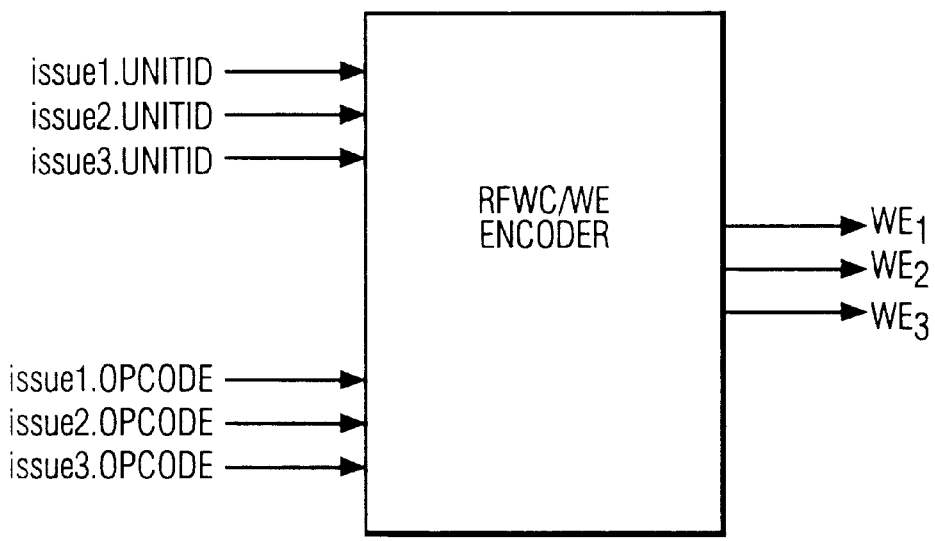
FIG. 9b shows the RFWC/WE encoder.

FIG. 9b shows a RFWC/WE encoder that takes unit ID's and opcodes and produces write enable inputs for the RFWC. The encoder can be a ROM, PLA, or logic. The encoder yields a "1" indicating that the operation has a result for the following operations: CONST, ALU, MUL, FPU, and MEM load. The encoder yields a "0" indicating no result for CONTROL and MEM store.

Figure 10:
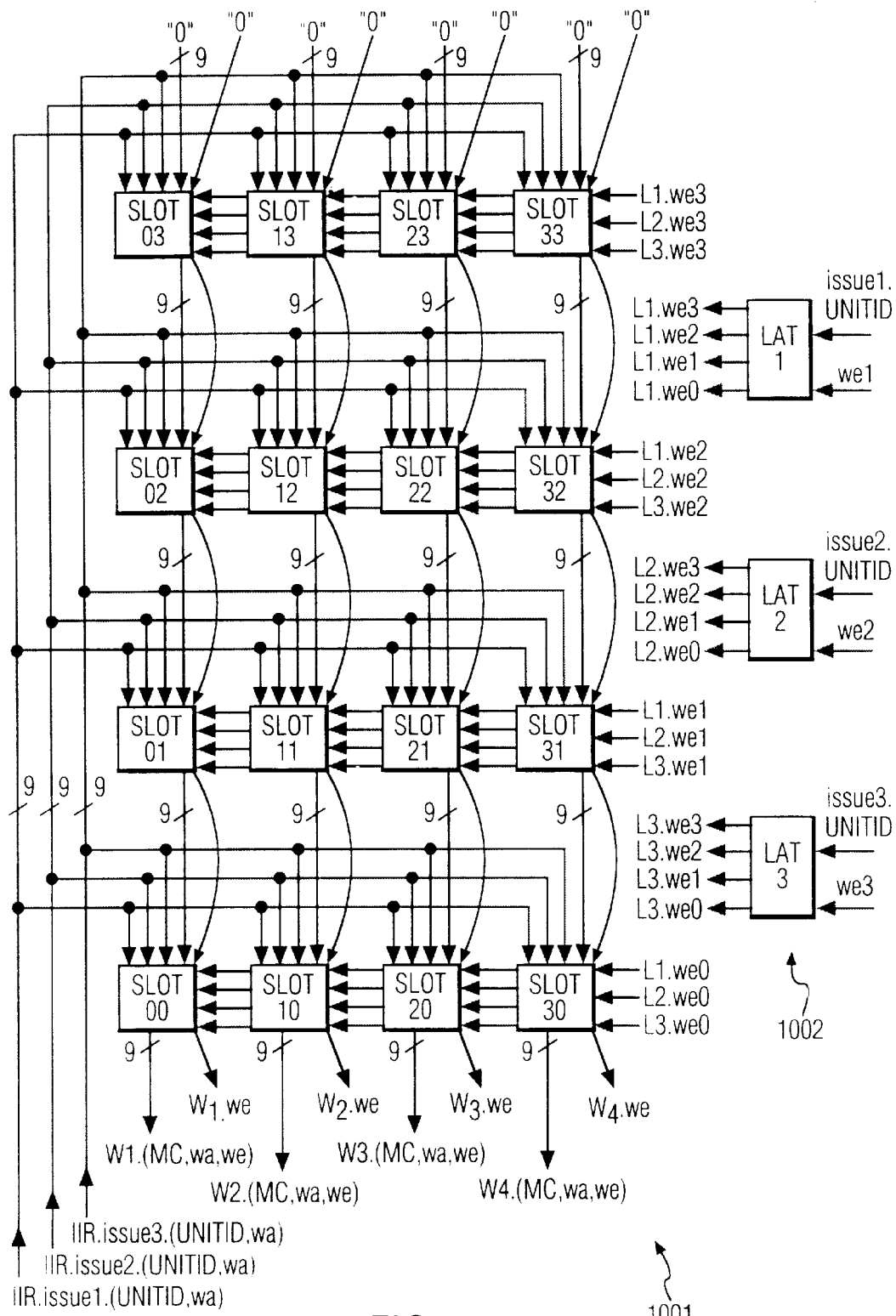
FIG. 10 shows more detail of the register file write control unit.

FIG. 10, shows an implementation example for the RFWC block. This implementation includes two sub-blocks, the SLOT block 1001 and the LAT block 1002. There are four rows and four columns of SLOTs. The four columns are needed for the four write ports, $W_1$, $W_2$, $W_3$, and $W_4$, of the register file. The four rows are needed for four possible latencies of the functional units, see table I above. The latency of a functional unit is the number of clock cycles between starting an operation on that unit and availability of the result of the operation at the input of the write multiplexers.

TABLE I

| UNIT | LATENCY |
|---|---|
| CONTROL | N/A |
| CONST | 0 |
| ALU1, ALU2 | 1 |
| MEM | 1 |
| MUL | 2 |
| FPU | 3 |

For each unit i.d., such as MUL, if the corresponding input write enable signal is TRUE, the latency is found by the LAT blocks of the RFWC. In the case of the MUL unit, the latency is 2. The RFWC then sets a write enable flag for the latency row corresponding to the latency found. For the MUL functional unit, a free SLOT is located in the latency row 2, where unit id write address and write enable information are stored. During the following two clock cycles, this information is passed along a column to the latency row 0.

Each SLOT row is used for a particular latency. The top row is used for latency 3 and the bottom row is used for latency 0. Each row passes data to the row below it in every clock cycle. The data passed is the unit i.d., write address, and write enable indication.

The output of the latency row 0 is the output of the RFWC block.

Each row gets three write enable control signals, produced by the LAT sub-block 1002. The rightmost SLOT in a row gets these control inputs. After some logic operations, this rightmost SLOT passes three control outputs to the SLOT block next to the left within the same row. For example, SLOT 33 gets three write enable signals (L1.we, L2.we, L3.we) from the LAT blocks. Control output of SLOT 33 is passed to the slot 23. Data output of SLOT 33 is passed to the SLOT 32.

Each LAT unit gets a unit i.d. (unitid) and write enable signal (we) from an issue slot in the IIR. There are three LAT units, because there are three slots in the IIR of the present example. The LAT unit produces four write enable signals (we0, we1, we2, we3). If the unit id is CONST (latency=0) and the corresponding we input is TRUE, then we0 is made true. If the unit i.d. is ALU1, ALU2, or MEM (latency=1) and the corresponding we input is TRUE, then we1 is made TRUE. If the unit i.d is MUL (latency=2) and issue.we is TRUE, then we2 is made TRUE. If the unit i.d. is FPU (latency=3) and issue.we is TRUE, then we3 is made TRUE.

Figure 11:
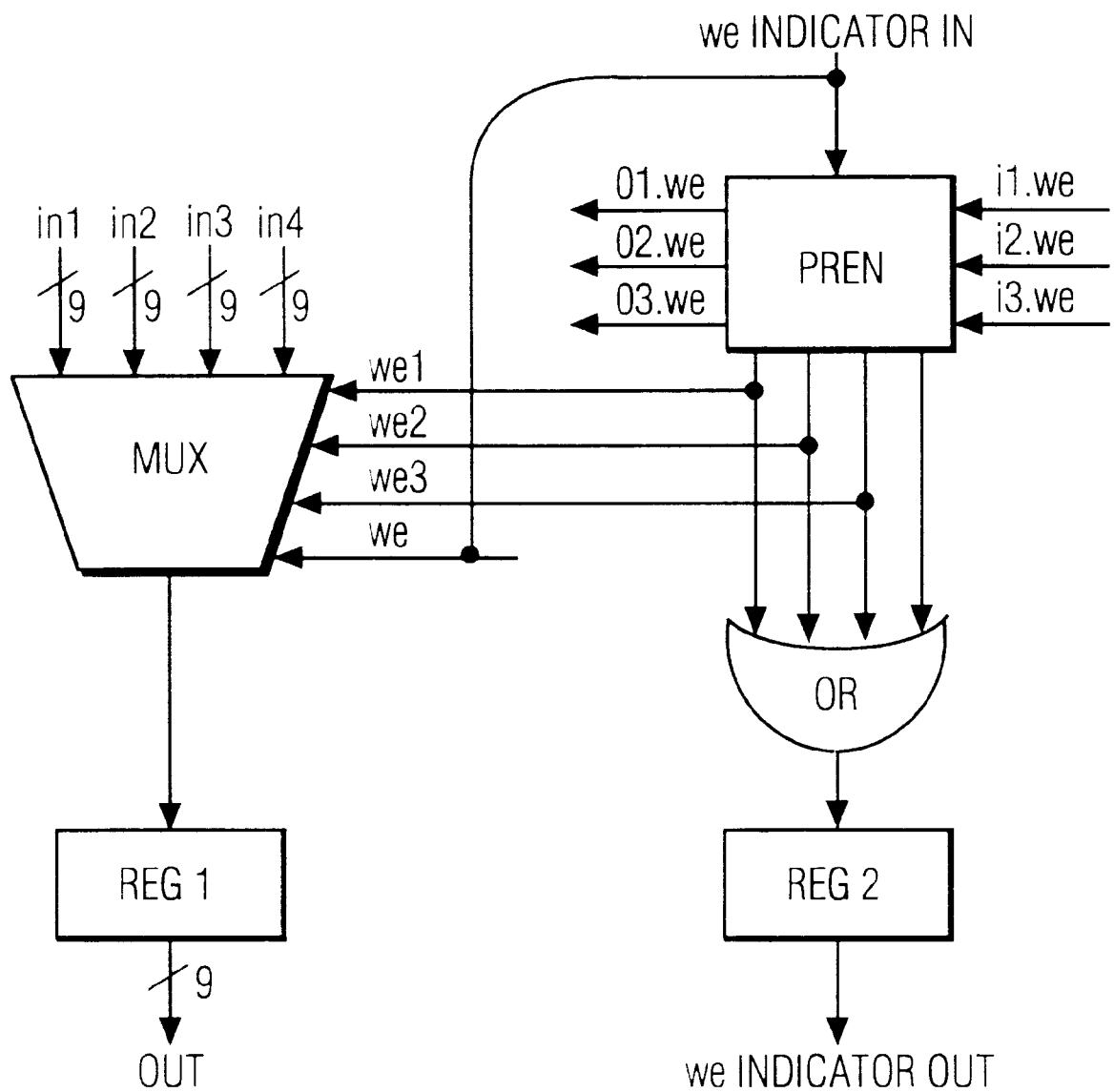
FIG. 11 shows more detail of a SLOT block of FIG. 10.

FIG. 11 shows an implementation example for one of the SLOT sub-blocks. Each SLOT gets four data inputs (in1, in2, in3, in4) from the IIR and produces one data output (out). In1, in2, in3, in4, and out each have 9 wires, three to pass the unit id and 6 to pass the write address (wa). The first input (in1) is IIR.issue1.unitid and IIR.issue1.Rdest. The second input (in2) is IIR.issue2.Rdest and IIR.issue2.unitid. The third input (in3) is IIR.issue3.Rdest and IIR.issue3.unitid. The fourth input (in4) is connected to the output of a row slot above, except in the top row where this input is connected to receive all zeroes.

Each SLOT gets four control signals ("we indicator in", i1.we, i2.we, and i3.we). The signals i1.we, i2.we, and i3.we come from the next block to the right, except for the rightmost block in a row, where these signals come from the corresponding LAT block. The signal "we indicator in" comes from the next block up, except for the top block where it is a wired "0".

In addition, the "we indicator in" of one row slot is connected to the "we indicator out" of the above SLOT. SLOTs in the top row receive a "0" "we indicator in".

Each SLOT produces four control signals (o1.we, o2.we, o3.we, and "we indicator out"). The signals o1.we, o2.we, and o3.we are supplied to a next block to the left, except in a leftmost slot where they are not connected. The signal "we indicator out" is supplied to a next block below, except in a bottom most slot where this signal is supplied to the register file as the write port enable signal ($W_1$.we, $W_2$.we, $W_{3.we}$, $w4$.we). The out.unitid signals of the bottom row are the $W_1MC$, $W_{2MC}$, $w3MC$, and $W_4MC$ signals applied to the multiplexers 801, 802, 803, and 804 of FIG. 8. The out.wa signals of the bottom row are the register file write addresses ($W_1$.wa, $W_2$.wa, $W_3$.wa, $W_4$.wa) applied to register file 403 in FIG. 6b.

Each SLOT has four sub-blocks: MUX, a 4:1 multiplexer which chooses one of in1, in2, in3 and in4 under control of we1, we2, we3, and we; PREN, a priority encoder which produces we1, we2, we3, we, o1.we, o2.we, and o3.we from inputs we, i1.we, i2.we, and i3.we; a four input logical OR gate, which has we1, we2, we3 and we as inputs. The MUX outputs to register REG1 and the OR outputs register REG2. The outputs of the registers are the output of the block. The slots of the lowest row lack these registers, as no storage is necessary.

The PREN unit makes sure that for all possible combinations of write enables for all latencies a free slot is found in the required latency row. A truth table for PREN is given in TABLE II below.

TABLE II

PREN LOGIC TRUTH TABLE

| i1.we | i2.we | i3.we | we indicator in | we1 | we2 | we3 | o1.we | o2.we | o3.we |
|---|---|---|---|---|---|---|---|---|---|
| x | x | x | 1 | 0 | 0 | 0 | i1.we | i2.we | i3.we |
| 1 | x | x | 0 | 1 | 0 | 0 | 0 | i2.we | i3.we |
| 0 | 1 | x | 0 | 0 | 1 | 0 | 0 | 0 | i3.we |
| 0 | 0 | 1 | 0 | 0 | 0 | 1 | 0 | 0 | 0 |
| 0 | 0 | 0 | 0 | 0 | 0 | 0 | 0 | 0 | 0 |

The MUX of FIG. 11 connects in4 to out if the we indicator in signal is active. It connects in3 to out if we3 is active, in2 if we2 is active, and in1 if we1 is active, respectively. The PREN unit ensures that only one of these is active ("1") at a time.

The RFWC write control unit hardware described in FIGS. 9–11 requires that the programmer or compiler prevent more than four writes ever occurring at one time. For instance, the following operation sequence is forbidden

| time $i$ | : FPU | ... | ... |
|---|---|---|---|
| $i+1$ | : MUL | ... | ... |
| $i+2$ | : $ALU_1$ | $ALU_2$ | ... |
| $i+3$ | : CO | ... | ... |

This example sequence would require 5 write buses to the register file, one to write the result of the CO operation completing in cycle i+3, two for the $ALU_1$, and $ALU_2$ operations started in "i+2" and completing in "i+3", one for the MUL operation, and one for the FPU operation.

Forbidding certain rare sequences of operations barely influences system performance and lowers the hardware cost. In this particular example, a register file with four write ports suffices instead of a more expensive register file with five write ports.

I claim:

1. A VLIW processor comprising
   i. a first number of functional units, each for executing a respective operation in parallel with execution of operations in the other functional units, which first number is at least three; and
   ii. an instruction issue register having a second number of slots, each slot being for holding a single respective operation for execution on a respective one of the functional units, execution being started in a same clock cycle for each of the operations that are held simultaneously in the instruction issue register, which second number is at least two;
   wherein the first number is greater than the second number, so that in each clock cycle the instruction issue register holds up to the second number of operations for execution on up to the second number of functional units; and does not hold any operation or any NOP for at least a remaining number of functional units, which remaining number is equal to the difference between the first and second number.

2. The processor of claim 1
   wherein each operation specifies at most a third number of operands, which third number is greater than or equal to one; and
   further comprising register means for storing operands for the functional units, the register means including the second number of groups of read ports, each group of read ports having at most the third number of read ports.

3. The processor of claim 2 further comprising
   means for switching data from the read ports of the register means to inputs of the functional units under control of the instruction issue register.

4. The processor of claim 1
   wherein each operation yields at most a fourth number of results, which fourth number is greater than or equal to one; and
   further comprising register means for storing results from the functional units the register means including at least the second number of groups of write ports, each group of write ports having at most the fourth number of write ports.

5. The processor of claim 4 further comprising switching means for switching data from outputs of the functional units to the write ports of the switching means.

6. The processor of claim 1 wherein each operation specifies at most a third number of operands and yields at most a fourth number of results, which third number is greater than or equal to one and which fourth number is greater than or equal to one; and further comprising register means for storing operands for and results from the functional units, the register means including the second number of groups of read ports and at least the second number of groups of write ports, each group of read ports having at most the third number of read ports and each group of write ports having at most the fourth number of write ports.

7. The processor of claim 1 wherein each operation specifies at least one operand; and further comprising register means for storing operands for the functional units, the register means including at least the second number of read ports, at least one coupled with each of the slots.

8. The processor of claim 1 wherein when the first number is N the second number is an integer in a range having endpoints N/4 and 2N/3.

9. The processor of claim 1 wherein all the slots have a same, fixed length.

10. The processor of claim 1 wherein each slot includes at least one bit for storing a unit identification code for identifying a respective one of the functional units.

11. The processor of claim 1 further comprising a multiport register file for storing operands for the functional units, wherein a number of read ports of the multiport register file is determined by the second number and by a maximum number of operands used by any functional unit, but not by the first number.

12. The processor of claim 1 further comprising a multipor register file for storing results from the functional units, wherein a number of write ports of the multiport register file is determined by the second number and by a maximum number of results produced by any functional unit, but not by the first number.

* * * * *